(12) United States Patent
Chen et al.

(10) Patent No.: US 8,393,527 B2
(45) Date of Patent: Mar. 12, 2013

(54) SOLDER APPARATUS

(75) Inventors: Xiang-Biao Chen, Wuhan (CN); Li-Ping Fan, Wuhan (CN); Xiao-Li Liu, Wuhan (CN); Yu-Lin Liu, Wuhan (CN)

(73) Assignees: Hong Fu Jin Precision (WuHan) Co., Ltd., Wuhan, Hubei Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 17 days.

(21) Appl. No.: 13/284,957

(22) Filed: Oct. 30, 2011

(65) Prior Publication Data

US 2012/0181323 A1 Jul. 19, 2012

(30) Foreign Application Priority Data

Jan. 19, 2011 (CN) .......................... 2011 1 0021721

(51) Int. Cl.
*B23K 3/00* (2006.01)
*B23K 1/00* (2006.01)
*B23K 1/002* (2006.01)
(52) U.S. Cl. ...................... 228/228; 228/227; 228/233.1; 228/234.1; 228/235.1; 228/262.1
(58) Field of Classification Search ................... 228/227, 228/228, 233.1, 234.1, 235.1, 262.1
See application file for complete search history.

(56) References Cited

U.S. PATENT DOCUMENTS

| | | | | |
|---|---|---|---|---|
| 3,125,906 A | * | 3/1964 | Johnson | 228/4.5 |
| 5,436,202 A | * | 7/1995 | Miura | 228/102 |
| 5,683,026 A | * | 11/1997 | Kawatani et al. | 228/5.5 |
| 6,544,377 B1 | * | 4/2003 | Minamitani et al. | 156/299 |
| 2002/0024883 A1 | * | 2/2002 | Odashima et al. | 365/233 |

FOREIGN PATENT DOCUMENTS

JP  05259352 A  * 10/1993

OTHER PUBLICATIONS

English computer translation of JP 05259352 A.*

* cited by examiner

*Primary Examiner* — Erin Saad
(74) *Attorney, Agent, or Firm* — Altis Law Group, Inc.

(57) ABSTRACT

A solder apparatus includes a platform, an operating mechanism, a solder member, a heater, and a control box module. The control box module includes a temperature controller and a temperature sensor. The temperature controller defines a predetermined temperature. The temperature sensor is capable of measuring the temperature of the solder member. The temperature controller has the heater heat the solder member when the measured temperature of the solder member is lower than or equal to the predetermined temperature, and has the heater stop heating the solder member, when the measured temperature of the solder member is higher than the predetermined temperature.

11 Claims, 5 Drawing Sheets

SOLDER APPARATUS

BACKGROUND

1. Technical Field

The present disclosure relates to a solder apparatus.

2. Description of Related Art

Usually, a thermocouple is adhered to a CPU by glue, for measuring a working temperature of the CPU. However, in a typical adhesion method, the CPU may be damaged, because a high temperature of a solder head that is used to solder the thermocouple onto the CPU. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
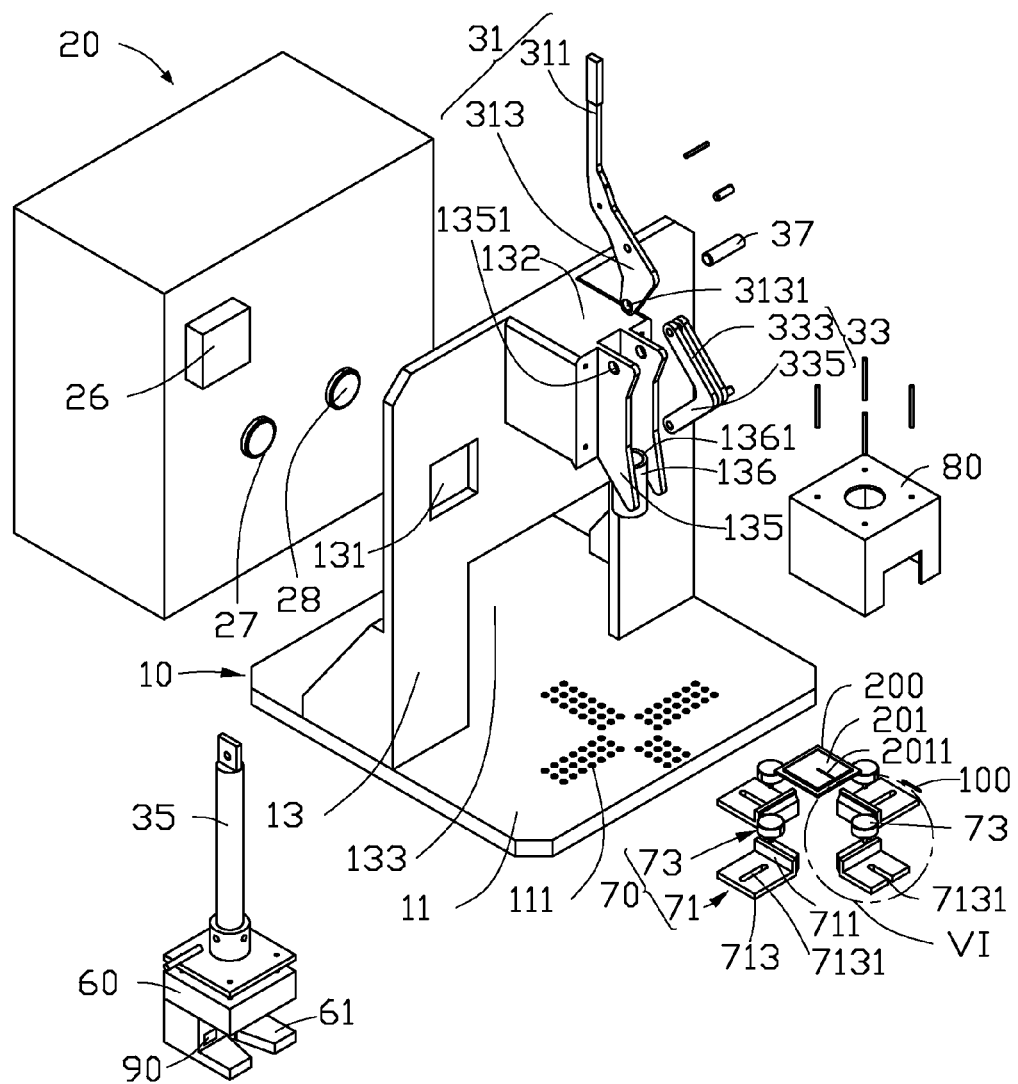
FIG. 1 is an exploded, isometric view of a solder apparatus, a thermocouple and a chip in accordance with an embodiment.

Referring to FIG. 1, a solder apparatus is configured for soldering a thermocouple 100 to a heat-generating member 200. The heat-generating member 200 may be, for example, a chip, such as a CPU. A heat-dissipating piece 201 is located on the heat-generating member 200. A slit 2011 is defined in the heat-dissipating piece 201. The solder apparatus in accordance with one embodiment includes a platform 10, a control box module 20, an operating mechanism 30, a solder member 60, and a positioning assembly 70.

The platform 10 includes a bottom wall 11 and a support 13 located on the bottom wall 11. A plurality of mounting holes 111 is defined in the bottom wall 11 at a front side of the support 13. The mounting holes 111 are substantially arrayed in a cross-shape around a square area. The support 13 defines a through hole 131 and a through opening 133 below the through hole 131. A mounting portion 132 is located on a front surface of the support 13 at one side of the through hole 131 and above the through opening 133. Two mounting pieces 135 are located on a front surface of the mounting portion 132. In an embodiment, the two mounting pieces 1351 are substantially parallel to each other. A pivot hole 1351 is defined in a top portion of each mounting piece 1351. A positioning portion 136 with a positioning hole 1361 is located between bottom portions of the mounting pieces 1351.

Figure 4:
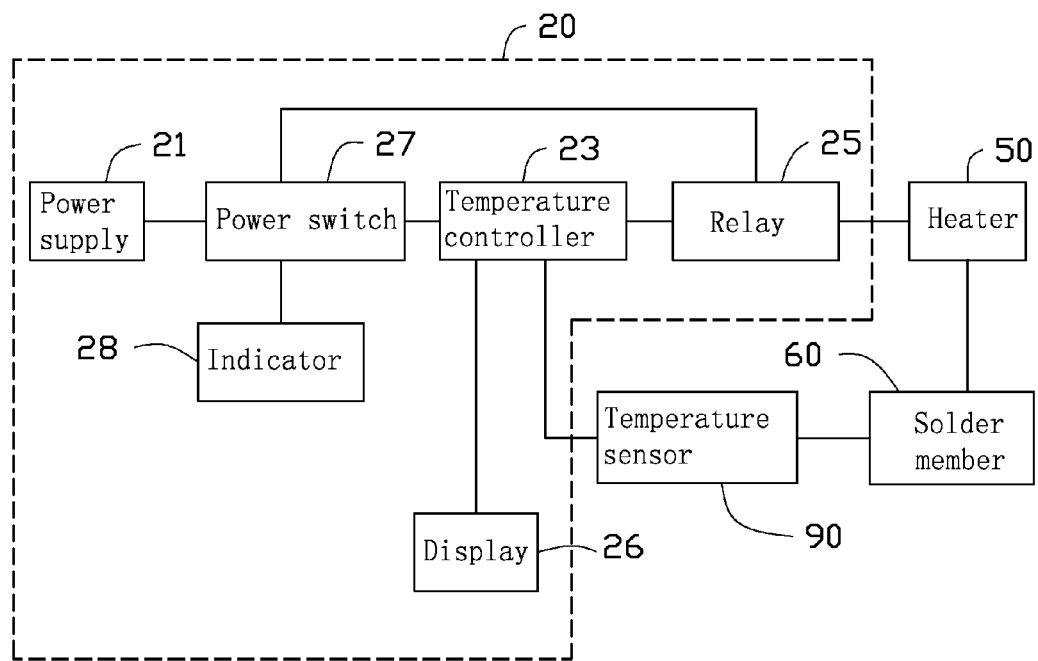
FIG. 4 is a block view showing components and a connection relationship of the solder apparatus of FIG. 1, in accordance with an embodiment.

Referring to FIGS. 1 and 4, the control box module 20 includes a power supply 21, a temperature controller 23, a relay 25, and a display 26. The temperature controller 23 is connected to the power supply 21 by a power switch 27. The relay 25 is connected to the temperature controller 23 and the power switch 27. The display 26 is connected to the temperature controller 23. An indicator 28 is connected to the power switch 27. In an embodiment, the indicator 28 is a light-emitting diode.

Figure 2:
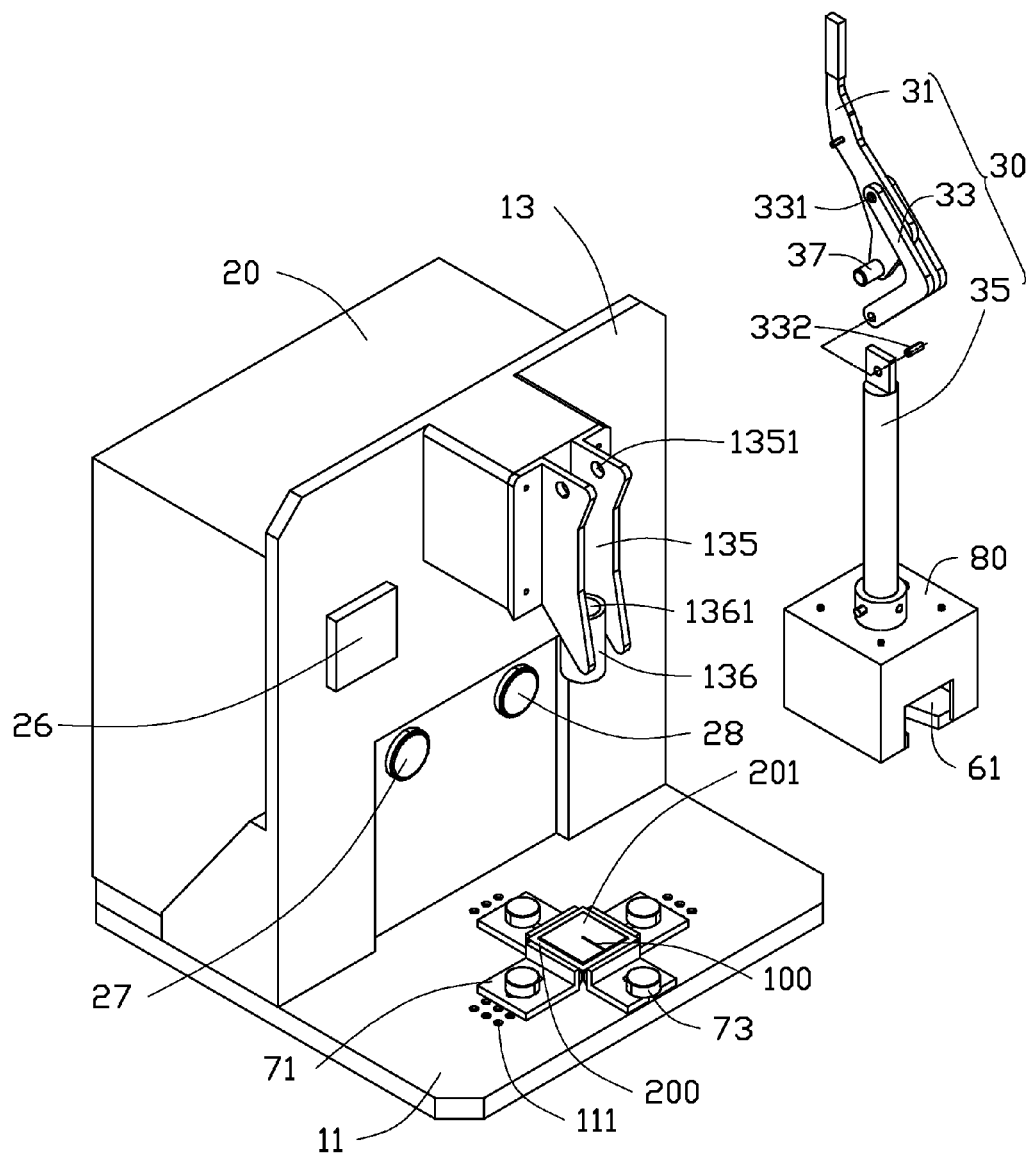
FIG. 2 is a partially assembled view of FIG. 1.

Referring to FIG. 2, the control box module 20 is secured to the platform 10 on a rear side of the support 13. The display 26 extends through the through hole 131, and the power switch 27 and the indicator 28 extend through the through opening 133.

Figure 3:
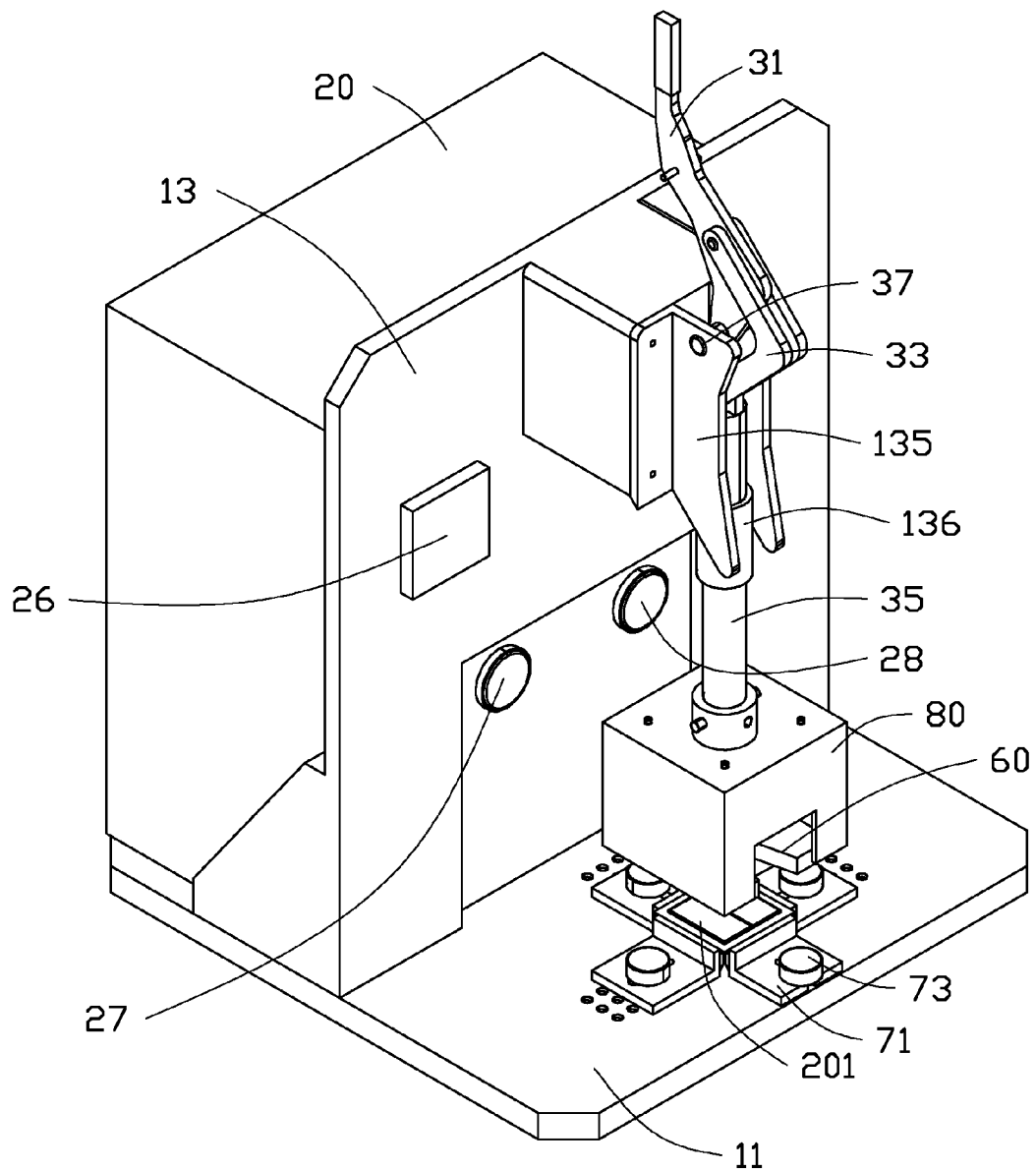
FIG. 3 is an assembled view of FIG. 1.

The operating mechanism 30 includes a handgrip 31, two connecting arms 33, and a pole 35. The handgrip 31 includes an operating portion 311 and a securing portion 313 extending from the operating portion 311. Each of the two connecting arms 33 includes a first connecting portion 333 and a second connecting portion 335 extending from the first connecting portion 333. In one embodiment, the first connecting portion 333 is substantially perpendicular to the second portion 335. Referring to FIG. 3, a first end of the securing portion 313 is rotatably secured between the first connecting portions 333 by a first shaft 331, and a second end of the securing portion 313 is rotatably secured between the two mounting pieces 1351 by a post 37 engaged in the pivot holes 1351. The second connecting portion 335 is rotatably secured to the pole 35 by a second shaft 332. The pole 35 is slidably received in the positioning hole 1361. When the handgrip 31 is rotated about the post 37, the connecting arms 33 are urged to move by the handgrip 31, thereby sliding the pole 35 in the positioning hole 1361. In rotation of the handgrip 31, the connecting arms 33 are rotated relative to the handgrip 31 and the pole 35.

Referring to FIG. 1, the solder member 60 is fixed to a distal end of the pole 35 opposite to the operating mechanism 30. The solder member 60 includes a solder head 61. Referring to FIG. 4, a heater 50 is provided to heat the solder head 61. The heater 50 is connected to the temperature controller 25. Referring to FIGS. 2 and 4, a temperature sensor 90 is attached to the solder member 60 and substantially adjacent the solder head 61. The temperature sensor 90 is connected to the temperature controller and capable of measuring the temperature of the solder head 61. A shielding member 80 is secured to the pole 35 to cover the solder member 60, for preventing the solder member 60 from burning the users.

The positioning assembly 70 includes four positioning members 71. Each positioning member 71 includes a bottom plate 713, a retaining portion 711 located on an end of the bottom plate 713, and a supporting portion 715 located on the retaining portion 711. Each bottom plate 713 defines a slot 7131, into which a fastener 73 is inserted and the fastener is capable of sliding in the slot 7131. In an embodiment, the slot 7131 extends in a direction generating a surface of the retaining portion 711. Referring to FIG. 2, the positioning assembly 70 is secured to the bottom wall 11 of the platform 10. The slots 7131 are corresponding to some of the mounting holes 111, and the fasteners 73 are engaged into the corresponding holes 111. The positioning assembly 70 is adapted to be differently positioned on the bottom wall according to the size of the heat-generating member 200.

Figure 5:
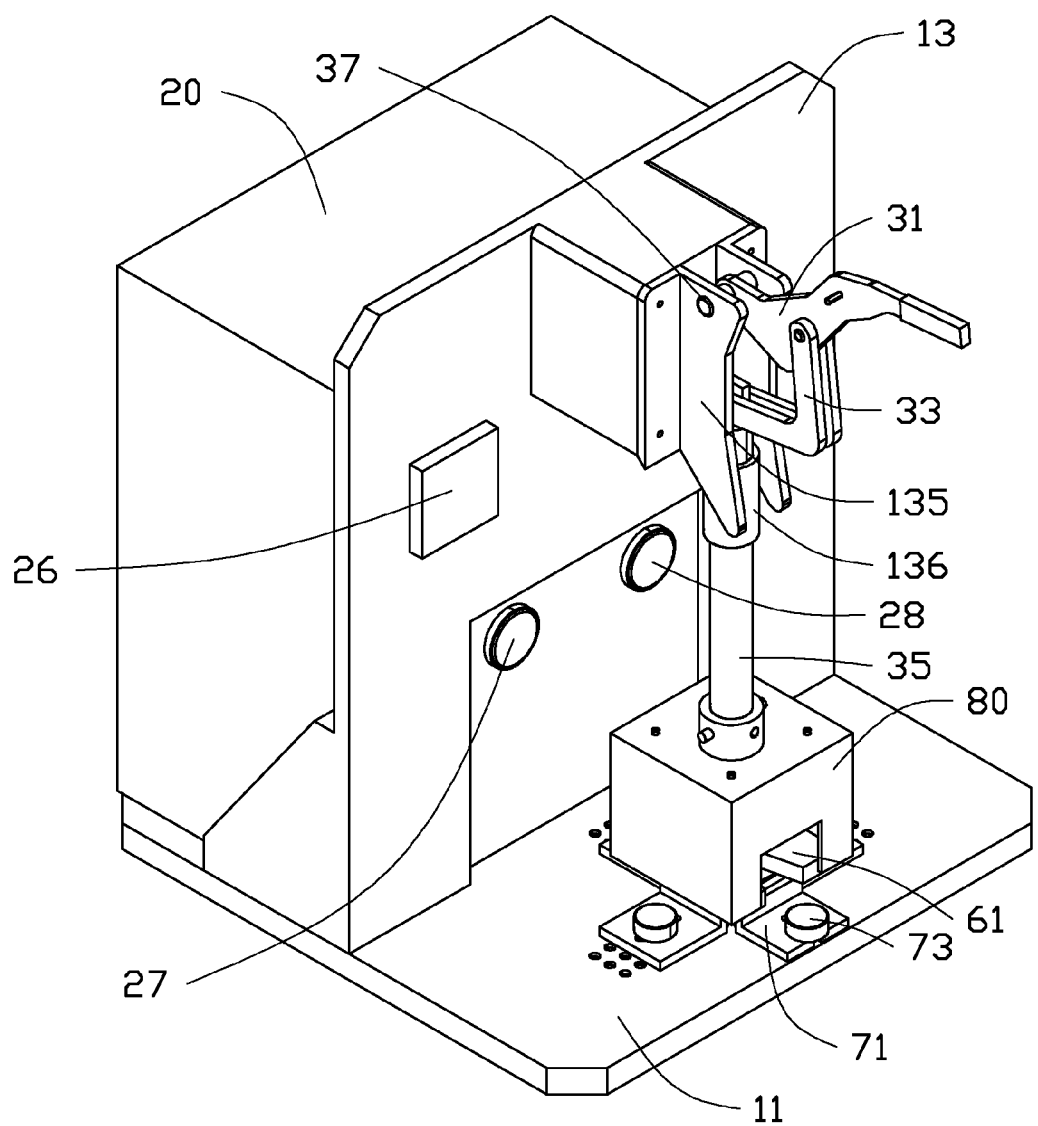
FIG. 5 is similar to FIG. 3, but showing an operating mechanism in a different position.

Referring to FIGS. 3-5, in use, the heat-generating member 200 is placed on the supporting portions 715 and engaged among the retaining portions 711 of the positioning member 71. The thermocouple 100 and a solder material (not shown) are placed in the slit 2011 of the heat-dissipating piece 201.

The melting point of the solder material is less than that of the heat-dissipating piece 201. In an embodiment, the solder material may be an indium wire. The power switch 27 is switched on, and the indicator 28 shows that the solder apparatus is at work. A predetermined temperature is defined by the temperature controller 23 and is shown on the display 26. The temperature sensor 90 measures the temperature of the solder head 61. The temperature controller 23 sends the measured temperature of the solder head 61, and the display 26 shows the measured temperature. If the measured temperature is lower than or equal to the predetermined temperature, the temperature controller 23 switches on the relay 25, and the solder head 61 is heated by the heater 50. But if the measured temperature is higher than or equal to the predetermined temperature, the temperature controller 23 switches off the relay 25. In one embodiment, the predetermined temperature is slightly higher than the melting point of the solder material.

The handgrip 31 is rotated down to slide the pole 35 and the solder member 60, until the solder head 61 touches the heat-dissipating piece 201, and the solder member 60 is located in a first position. The heat is transferring from the solder head 61 to the heat-dissipating piece 201. When the temperature of the heat-dissipating piece 201 is higher than or equal to the melting point of the solder material. The solder material is melted. Then, the handgrip 31 is rotated up to slide the solder head 61 away from the heat-generating member 200, and the solder member 60 is located in a second position. The heat-dissipating piece 201 is no longer heated. Therefore, the solder material liquid is cooled to solder the thermocouple 100 with the heat-dissipating piece 201.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A solder apparatus comprising:
    a platform comprising a bottom wall and a support located on the bottom wall;
    an operating mechanism secured to the support;
    a solder member secured to the operating mechanism;
    a heater;
    a control box module comprising a temperature controller, a relay, and a temperature sensor, the temperature controller is adapted to switch the relay on or off according to a predetermined temperature, the temperature sensor capable of measuring a temperature of the solder member, wherein the relay is switched on and the heater heats the solder member when a measured temperature of the solder member is lower than or equal to the predetermined temperature; the relay is switched off and the heater discontinues heating the solder member when the measured temperature of the solder member is higher than the predetermined temperature;
    the operating mechanism comprises a handgrip and a pole, the handgrip is rotatably secured to the support, and the solder member is secured to the pole; and
    the operating mechanism further comprises two connecting arms, each of the two connecting arms comprise a first connecting portion and a second connecting portion substantially perpendicularly connected to the first connecting portion, the handgrip is rotatably secured between the first connecting portion of each of the two connecting arms, and the second connecting portion is rotatable secured to the pole,
    wherein the operating mechanism is operable to move the solder member for touching a heat-dissipating piece located on a heat generating member, therefore the solder member is capable of soldering a thermocouple to the heat-dissipating piece, or to move the solder member away from the heat-dissipating piece.

2. The solder apparatus of claim 1, wherein the solder apparatus further comprises a positioning assembly configured to support the heat-generating member, the positioning assembly is secured to the bottom wall, the positioning assembly is configured to be differently positioned on the bottom wall according to a size of the heat-generating member.

3. The solder apparatus of claim 2, wherein the positioning assembly comprises a plurality of positioning members, each of the plurality of positioning members comprises a bottom plate secured to the bottom wall, a retaining portion located on the bottom plate and a supporting portion located on the retaining portion, the retaining portion is configured to support the heat-generating member, the heat-generating member is engaged among the retaining portion of each of the plurality of positioning members.

4. The solder apparatus of claim 1, wherein the temperature sensor is attached to the solder member.

5. The solder apparatus of claim 1, the support further comprises two mounting pieces parallel to each other, a positioning portion comprising a positioning hole, the positioning portion and the handgrip are both located between the two mounting pieces, and the handgrip is rotatable relative to the two mounting pieces so that the pole is adapted to slide into the positioning hole by the connecting arms.

6. A solder apparatus comprising:
    a platform comprising a bottom wall and a support located on the bottom wall;
    an operating mechanism secured to the support;
    a solder member secured to the operating mechanism;
    a heater;
    a positioning assembly configured to support a heat-generating member, the positioning assembly being secured to the bottom wall, the positioning assembly is changeable to be differently positioned on the bottom wall according to a size of the heat-generating member;
    a temperature sensor attached to the solder member, the temperature sensor being capable of measuring a temperature of the solder member;
    a control box module secured to the platform, the control box module comprising a temperature controller adapted to switch the heater on or off according to a predetermined temperature wherein the heater is configured to heat the solder member when a measured temperature of the solder member is lower than or equal to the predetermined temperature, and the heater discontinues heating the solder member when the measured temperature of the solder member is higher than the predetermined temperature;
    the operating mechanism comprises a handgrip and a pole, the handgrip is rotatably secured to the support, and the solder member is secured to the pole; and
    the operating mechanism further comprises two connecting arms, each of the two connecting arms comprise a first connecting portion and a second connecting portion substantially perpendicularly connected to the first connecting portion, the first connecting portion is rotatably secured to the handgrip, and the second connecting portion is rotatably secured to the pole, wherein the solder member is configured to be moved by the operating mechanism between a first position and a second position; in the first position, the solder member abuts on a heat-dissipating piece located on the heat-generating member so that a thermocouple is soldered to the heat-dissipating piece by the solder member; and in the second position, the solder member is distanced away from the heat-dissipating piece.

7. The solder apparatus of claim 6, wherein the temperature controller is connected to a power supply by a power switch, the temperature sensor is connected to the temperature controller.

8. The solder apparatus of claim 6, wherein the control box module further comprises a relay, the relay is connected to the temperature controller and the power switch, and the temperature controller is capable of switch on or off the relay according to the predetermined temperature and the measured temperature.

9. The solder apparatus of claim 6, wherein the support further comprises two mounting pieces parallel to each other, and the handgrip is rotatably secured between the two mounting pieces.

10. The solder apparatus of claim 9, wherein the support further comprises a positioning portion, the positioning portion comprises a positioning hole located between the two mounting pieces, and the pole is slidably received in the positioning hole.

11. The solder apparatus of claim 10, wherein the handgrip is rotatable relative to the two mounting pieces so that the pole is adapted to slide into the positioning hole by the connecting arms.

* * * * *